United States Patent Office 3,342,775
Patented Sept. 19, 1967

3,342,775
PROCESS OF COPRECIPITATION OF EPOXIES WITH CROSSLINKING AGENTS
David Aelony, Minneapolis, Minn., assignor to General Mills, Inc., a corporation of Delaware
No Drawing. Filed Apr. 16, 1964, Ser. No. 360,419
5 Claims. (Cl. 260—47)

The present invention relates to a solid composition containing an epoxy resin and a crosslinking agent in an intimately mixed, finely divided form.

Epoxy resins and curing agents in the form of a solution either in the presence or absence of an extraneous solvent are reactive at varying rates at room temperature; accordingly, it is not possible to prepare compositions of this type having any reasonable shelf life and such compositions must be prepared shortly before use. Attempts have been made to produce mechanical mixtures of solid epoxy resins and solid curing agents in a variety of ways as, for example, by milling the two components together at room temperature. Homogeneous mixtures of this type are difficult to make and, moreover, are difficult to maintain in complete homogeneity.

It has now been discovered that it is possible to produce stable mixtures of solid epoxy resins and curing agents therefor by coprecipitating such a composition from a solution by addition of a non-solvent.

It is therefore an object of the present invention to provide a novel method of producing a homogeneous mixture of a finely divided epoxy resin and curing agent. It is a further object of the invention to provide such a homogeneous mixture by the coprecipitation of the two materials from a solution by the addition of a large volume of a non-solvent.

The present invention contemplates the use of any solid epoxy resinous material. By this term is meant any epoxy resinous material which does not appreciably soften at temperatures about 50° C. and preferably not below about 100° C.

The polyepoxides which can be used in preparing the coating compositions of the present invention comprise those materials possessing more than one vicinal epoxy group, i.e., more than one

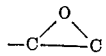

group. These compounds may be saturated or unsaturated, aliphatic, cycloaliphatic, aromatic or heterocyclic, and may be substituted, if desired, with non-interfering substituents such as chlorine, hydroxyl groups, ether radicals and the like. The polyepoxides may be monomeric or polymeric. The epoxy group may be terminal or non-terminal.

For clarity, many of the polyepoxides will be referred to hereinafter in terms of their epoxy equivalency. The term "epoxy equivalency" refers to the number of epoxy groups contained in the average molecule of the desired material. The epoxy equivalency is obtained by dividing the average molecular weight of the polyepoxide by the epoxide equivalent weight. The epoxide equivalent weight is determined by heating one gram sample of the polyepoxide with an excess of pyridinium chloride dissolved in pyridine at the boiling point for 20 minutes. The excess pyridinium chloride is then back-titrated with 0.1 N sodium hydroxide to the phenolphthalein end point. The epoxide value is calculated by considering one HCl as an equivalent of one epoxide. This method is used to obtain all epoxide values reported herein, unless otherwise stated.

If the polyepoxides are single monomeric compounds having all of their epoxide groups intact, their epoxy equivalency will be whole integers, such as 2, 3, 4 and 5. However, in the case of the polymeric-type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5 and the like.

The monomeric-type polyepoxide compounds may be exemplified by the following:

vinylcyclohexene dioxide,
epoxidized soyabean oil,
butadien dioxide,
1,4-bis(2,3-epoxypropoxy)benzene,
1,3-bis(2,3-epoxypropoxy)benzene,
4,4'-bis(2,3-epoxypropoxy) diphenyl ether,
1,8-bis(2,3-epoxypropoxy)octane,
1,4-bis(2,3-epoxypropoxy)cyclohexane,
4,4'-bis(2-hydroxy-3,4-epoxybutoxy)diphenyldimethylmethane,
1,3-bis(4,5-epoxypentoxy)-5-chlorobenzene,
1,4-bis(3,4-epoxybutoxy)-2-chlorocyclohexane,
diglycidyl ether,
1,3-bis(2-hydroxy-3,4-epoxybutoxy)benzene,
1,4-bis(2-hydroxy-4,5-epoxypentoxy)benzene,
1,2,5,6-di-epoxy-3-hexyne,
1,2,5,6-di-epoxyhexane, and
1,2,3,4-tetra(2-hydroxy-3,4-epoxybutoxy)butane.

Other examples of this type include the glycidyl polyethers of the polyhydric phenols obtained by reacting a polyhydric phenol with a great excess, e.g., 4 to 8 mol excess, of a halogen-containing epoxide in an alkaline medium. Polyhydric phenols that can be used for this purpose include bis-phenol, resorcinol, catechol, hydroquinone, methyl resorcinol, or polynuclear phenols, such as 2,2 - bis(4 - hydroxyphenyl)butane, 4,4'-dihydroxybenzophenone, bis(4-hydroxyphenyl)ethane, and 1,5-dihydroxynaphthalene. The halogen-containing epoxides may be further exemplified by 3-chloro-1,2-epoxybutane, 3-bromo-1,3-epoxyhexane, 3-chloro-1,2-epoxyoctane and the like.

Examples of the polymeric-type polyepoxides include the polyepoxypolyhydroxy polyethers obtained by reacting, preferably in an alkaline or an acid medium, a polyhydric alcohol or polyhydric phenol with a polyepoxide, such as the reaction product of glycerol and bis(2,3-epoxypropyl)ether, the reaction product or sorbitol and bis(2,3-epoxy-2-methylpropyl) ether, the reaction product of pentaerythritol and 1,2-epoxy-4,5-epoxypentane, the reaction product of bis-phenol and bis (2,3-epoxy-2-methylpropyl)ether, the reaction product of resorcinol and bis(2,3-epoxypropyl)ether, and the reaction product of catechol and bis(2,3-epoxypropyl)ether.

A further group of the polymeric polyepoxides comprises the hydroxy-substituted polyepoxide polyethers obtained by reacting, preferably in an alkaline medium, a slight excess, e.g., 0.5 to 3 mol excess, of a halogen-containing epoxide as described above, with any of the aforedescribed polyhydric phenols, such as resorcinol, catechol, bis-phenol, bis(2,2' - dihydroxy - dinaphthyl) methane and the like.

Also included within this group are the polyepoxy polyethers obtained by reacting, preferably in the presence of an acid-acting compound, such as hydrofluoric acid, one of the aforedescribed halogen-containing epoxides with a polyhydric alcohol, such as glycerol, propylene glycol, ethylene glycol, trimethyleneglycol, butylene glycol and the like, and a subsequently treating the resulting product with an alkaline component.

Other polymeric polyepoxide compounds include the polymers and copolymers of the epoxy-containing monomers possessing at least one polymerizable ethylenic linkage. When this type of monomer is polymerized in the substantial absence of alkaline or acidic catalysts such as in the presence of heat, oxygen, peroxy compound, actinic light and the like they undergo addition polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative examples of these polymers include poly(allyl-2,3-epoxypropyl ether), poly(2,3-epoxypropyl crotonate), allyl-2,3-epoxypropyl etherstyrene copolymer, methallyl-3,4-epoxybutyl ether-allyl benzoate copolymer, poly(vinyl-2,3-epoxypropyl ether), allyl glycidyl ether-vinyl acetate copolymer and poly(4-glycidyloxystyrene).

Examples of non-terminal polyepoxides include epoxidized esters of polyethylenically unsaturated monocarboxylic acids, such as epoxidized linsede, soybean, perilla, oiticica, tung, walnut and dehydrated castor oil, methyllinoleate, butyl linoleate, ethyl 9,12-octadecadienoate, butyl 9,12-15-octadecatrienoate, butyl eleostearate, monoglycerides of tung oil fatty acids, monoglycerides of soybean oil, sunflower, rapeseed, hempseed, sardine, cottonseed and the like.

Another group of non-terminal polyepoxides includes the epoxidized esters of unsaturated monohydric alcohols and polycarboxylic acids, such as, for example, di(2,3-epoxybutyl)adipate,
di(2,3-epoxybutyl)oxalate,
di(2,3-epoxheptyl)succinate,
di(2,3-epoxybutyl)maleate,
di(2,3-epoxyoctyl)pimelate,
di(2,3-epoxypropyl)phthalate,
di(2,3-epoxycyclohexyl)adipate,
di(2,3-epoxypentyl)thiodipropionate,
di(5,6-epoxytetradecyl)diphenyldicarboxylate,
di(3,4-epoxyheptyl)sulfonyldibutyrate,
tri(2,3-epoxypropyl) 1,2,4-butanetricarboxylate,
di(5,6-epoxypentadecyl)tartarate,
di(4,5-epoxytetradecyl)maleate,
di(3,4-epoxybutyl)citrate, and
di(4,5-epoxyoctadecyl)malonate.

Preferred members of this group compise the glycidyl esters, such as the glycidyl esters of the dicarboxylic acids preferably containing from 2 to 18 carbon atoms, such as diglycidyl phthalate, diglycidyl maleate, diglycidyl adipate, diglycidyl sebacate, diglycidyl cyclohexanedicarboxylate and the like.

Another group of the polyepoxides includes the epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-epoxycyclohexanoate, 3,4-epoxyxylohexyl 4,5-epoxyoctanoate, 2,3-epoxycyclohexylmethyl epoxycyclohexane carboxylate.

Still another group of the epoxy-containing materials includes epoxidized derivatives of polyethylenically unsaturated polycarboxylic acids such as, for example, dimethyl 8,9,12,13-diepoxyeiconsanedioate,
dibutyl 7,8,11,12-diepoxyoctadecanedioate,
dioctyl 10,11-diethyl-8,9,12,13-diepoxy-eiconsanedioate,
dihexyl 6,7,10,11-diepoxyhexadecanedioate,
didecyl 9-epoxy-ethyl-10,11-epoxyoctadecanedioate,
dibutyl 3-butyl-3,4,5,6-diepoxycyclohexane-1,2-dicarboxylate,
dicyclohexyl 3,4,5,6-diepoxycyclohexane-1,2-dicarboxylate,
dibenzyl 1,2,4,5-diepoxycyclohexane-1,2-dicarboxylate, and
diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadien-styrene copolymers and the like.

Particularly preferred epoxy-containing organic materials to be employed in the process of the invention are the members of the group consisting of the organic compounds possessing a plurality of epoxyalkoxy radicals, e.g., two to four, joined to an organic radical which contains from one to two aromatic rings, organic compounds possessing a plurality of epoxyhydroxyalkoxy radicals, e.g., two to four, joined to an organic radical containing from one to two aromatic rings, the polyepoxy-containing polymeric reaction product of an aromatic polyhydric phenol and epihalohydrin, the polyepoxy-containing polymeric reaction product of an aliphatic polyhydric alcohol and epichlorohydrin, the polyepoxy-containing polymeric reaction product of a polyhydric phenol and a polyepoxide compound, the polyepoxy-containing polymeric reaction product of an aliphatic polyhydric alcohol and a polyepoxide compound, the polymers of the epoxy-containing monomers possessing at least one polymerizable ethylenic linkage prepared in the absence of alkaline or acidic catalysts, and copolymers of the foregoing epoxy-containing monomers and a monomer containing at least one $CH_2=C=$ group prepared in the absence of alkaline or acidic catalysts. The expression "epoxyalkoxy" radical refers to an alkoxy radical substituted with an epoxy group. The expression "epoxyhydroxyalkoxy radical" refers to an alkoxy radical substituted with a hydroxyl and epoxy group.

Coming under special consideration, particularly because of the fine quality of coatings prepared from their resinous products are the monomeric and polymeric-type glycidyl polyethers of dihydric phenols obtained by reacting epichlorohydrin with a dihydric phenol in an alkaline medium. The monomeric products of this type may be represented by the general formula

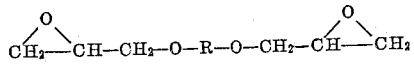

wherein R represents a divalent hydrocarbon radical of the dihydric phenol. The polymeric products will generally not be a single simple molecule but will be a complex mixture of glycidyl polyethers of the general formula

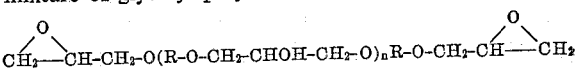

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess, to the epichlorohydrin. The reaction is preferably accomplished at temperatures within the range of from 50° to 150° C. The heating is continued for several hours to effect the reaction and the product is then washed free of salt and base.

Preferred members of the above-described group of polyepoxides are the glycidyl polyethers of the dihydric phenols, and especially 2,2-bis(4-hydroxyphenyl) propane, having an epoxy equivalency between 1.0 and 2.0 and a molecular weight between 900 and 2900. Particularly preferred are those having a Durrans mercury method softening point of at least about 100° C.

Another suitable group of polyglycidyl ethers for use in this invention are the polyglycidyl ethers of alpha, alpha, omega,omega-tetrakis(hydroxyaryl)alkanes. This group of compounds is described and illustrated in U.S. 2,806,016 to Schwarzer. The polyglycidyl ether prepared as in Example 1 of said patent has a melting point of about 85° C. and contains 0.452 epoxy equivalent per 100 grams.

Another group of such epoxy resins are those which are the reaction product of epichlorohydrin and bis(p-hydroxyphenyl) sulfone. Still another group of epoxy compounds which may be employed are the glycidyl esters of polymeric fat acids. These glycidyl esters are obtained by reacting the polymeric fat acids with polyfunctional halohydrins such as epichlorohydrins. In addition, the glycidyl esters are also commercially available epoxide materials. As the polymeric fat acids are composed largely of dimeric acids, the glycidyl esters thereof may be represented by the following theoretical, idealized formula:

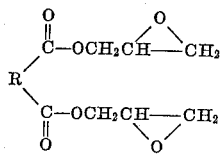

where R is the divalent hydrocarbon radical of dimerized unsaturated fatty acids.

Still another group of epoxide materials are the epoxidized novolac resins. Such resins are well known substances and readily available commercially. The resins may be represented by the following theoretical, idealized formula:

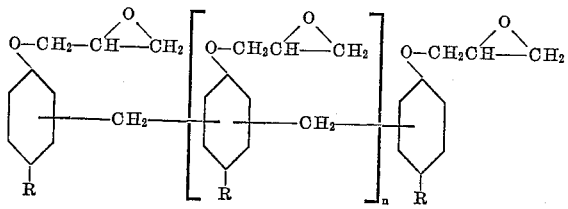

where R is selected from the group consisting of hydrogen and alkyl groups having up to 18 carbon atoms, and $n$ is an integer of from 1 to 10. Generally, $n$ will be an integer in excess of 1 to about 5.

A curing agent is required to convert the epoxy resins which have been described into hard, dry, stable cross-linked resins. In order to be useful in the process of the present invention, the curing agent must be sufficiently unreactive in a short period of time in its environment so as not to react at room temperature to a substantial degree with the epoxy resin and yet must be reactive at elevated temperatures used in the curing step to produce a cured epoxy resin having the hardness, chemical resistance, flexibility and other characteristics required of high quality resins. A great variety of curing agents for epoxy resins are known. Many are described in "Epoxy Resins—Their Applications and Technology" by Lee et al., McGraw-Hill Book Company, Inc., 1957, chapters 3 to 5. These curing agents vary in their properties and the particular curing agents selected will depend upon the particular composition, the period of time in which the mixture is to be stable, and the use to which it is to be put.

Typical curing agents which are suitable for the present invention include:

dimethyl octadecyl amine
dimethyl tallow amine
N,N,N',N'-tetramethyl dimer amine
1,4-bis(dimethylamino) benzene
N,N'-dimethylpiperazine
tetrazocyclodecane
glycidyl ether of bisphenol A and dimethylamine reaction products
benzyldimethylamine
alpha methylbenzyl dimethylamine
dimethylamino methyl phenol (DMP 10)
tetri(dimethyl aminomethyl)phenol (DMP 30)
bis(dimethyl aminomethyl)-o-cresol
bis(dimethyl aminomethyl)-t-butyl phenol
bis(dimethyl aminomethyl)octyl phenol
bis(dimethyl aminomethyl)nonyl phenol
bis(dimethyl aminomethyl)dodecyl phenol
tetrakis(dimethyl aminomethyl)bisphenol A
bis(dimethyl aminomethyl)hydroquinone
methylene bis(dimethyl aminomethyl)p-t-butyl phenol
dimethyl aminomethyl tetrahydro methylbenzoxazine
Mannich and tertiary amine salts of isophthalic acid, terephthalic acid, fumaric acid, etc.

Some of these curing agents are liquid and may be used as such, if they are not sufficiently reactive as to cure at room temperature in the presence of the finely divided epoxy resin. These liquid curing agents may be present in the form of a film on the surface of the epoxy resin or may actually be in the form of solid solutions with the epoxy resin. The preferred curing agents are the solid curing agents as there is less likelihood of these reacting at room temperature or at the slightly elevated temperatures encountered in the movement of these products in commerce. It is possible to modify the characteristics of the curing agents particularly of the amines, by converting them to salts. In many instances, the salts of liquid amines are solid and thereby adapt themselves to the present invention more readily. In addition, in a great many instances, the salts of the amines are less reactive at room temperature. At elevated temperatures, the salts usually decompose to liberate the amine and the acid either or both of which may enter into the curing reaction. The preferred curing agents are those sold under the DMP trademark by Rohm and Haas Chemical Company. These contain tertiary amine groups in the form of dimethylaminomethyl substituents on an aromatic ring. Of the acids used to form salts of amines, isophthalic acid is preferred although other acids such as terephthalic acid, citric, fumaric, malic, tartaric, maleic and isophthalic may be used. Other similar curing agents include the polyamide resins derived from polymeric acids, sold by General Mills under the trademark Versamid, where these resins are high melting or where the salts of these polyamide resins may be high melting.

In carrying out the invention, it is preferred to dissolve the epoxy resin and the curing agent in an organic solvent which is water miscible. Suitable solvents of this type include the simple esters, such as methyl and ethyl acetate, dioxane, tetrahydrofuran and the like. Many epoxy resins and curing agents are soluble in these solvents and the two reagents may be coprecipitated by the mere addition of large volumes of water to the system. The solvent is miscible with the water, and the resin and the curing agents precipitate in the form of finely divided powders which may be recovered by simple filtration and drying.

It is possible to use other solvent systems from which the resin and the curing agent may be precipitated by the addition of an organic solvent which is miscible with the primary solvent employed but in which the resin and the curing agent are insoluble. In such systems, chloroform, methyl ethyl ketone, methyl isobutyl ketone and the like may be used as primary solvents. Hydrocarbon solvents such as hexane may then be used as the precipitant.

*Example I*

200 grams of an epoxy resin derived from bisphenol A and epichlorohydrin having an equivalent weight of 925 and a melting point of 125° C. and 7.2 grams of tridimethylaminomethyl phenol (DMP-30) were dissolved in 650 ml. of acetone. This solution was added drop by drop to 8 liters of water being rapidly agitated. A precipitate was formed which was filtered, dried under water pump vacuum and finally under high vacuum. The dried material weighed 207 grams and was a white, fluffy powder. The powder was sprayed on heavy steel plate which was at a temperature of 400° F. The coating was then cured at 300° F. for (1) 5 minutes (2) 7 minutes (3) 10 minutes. The product showed good adhesion to the metal.

*Example II*

200 grams of an epoxy resin derived from bisphenol A and epichlorohydrin and having an equivalent weight of 1800 and a melting point in the range of 230–250° C. and 4.8 grams bis-(dimethylaminomethyl)-p-t-butyl phenol were dissolved at 300 ml. of acetone and precipitated as in the previous example in 8 liters of water. The dry material weighed 205 g. It sintered at 100 to 110° C. at melting point tube. The powder was sprayed on heavy steel plates which were at a temperature of 350° F. and the coatings baked at 300° F. for (1) 3 minutes (2) 5 minutes (3) 10 minutes. All coatings showed good adhesion to the metal.

*Example III*

200 grams of the epoxy resin in Example 2 and 6 grams of tetrakis - (dimethylaminomethyl) - 4,4' - di - hydroxyphenylpropane-2 were dissolved in 300 ml. of acetone and precipitated as previously described but in 12 liters of water. The dry, white powder weighed 203 grams. The coating was sprayed on heavy steel plate at a temperature of 300° F. and was baked for (1) 3 minutes (2) 6 minutes (3) 10 minutes. The product showed good adhesion to the metal.

It is apparent from these examples that the present invention provides a simple means of preparing stable, finely divided powder systems containing an epoxy resin and its curing agent and that these powder systems may be used very easily in the preparation of protective coatings.

While the above description has been with particular reference to the specific example, it is to be understood that the invention is not restricted thereto but may be varied within the scope of the appended claims.

The embodiments of the invention in which an exclusive property or privilege is claimed, are defined as follows:

1. Process of preparing an intimately mixed finely divided mixture of a solid epoxy resin containing 1,2 epoxide groups and a curing agent therefor which is unreactive toward said epoxy group at room temperature which comprises preparing a solution of said epoxy resin and curing agent in a solvent inert to the epoxy resin and curing agent and adding to said solution a non-solvent for said epoxy resin and curing agent which non-solvent is unreactive toward said epoxy resin and said curing agent and which is miscible with said solvent, in a quantity sufficient to precipitate said epoxy resin and curing agent in the form of a fine powder, and recovering said powder.

2. Process according to claim 1 in which the epoxy resin does not soften at temperatures below about 50° C.

3. Process according to claim 1 in which the epoxy resin does not soften at temperatures below about 100° C.

4. Process according to to claim 1 in which the epoxy resin is an epoxy ether of a polyhydric phenol.

5. Process according to claim 1 in which the curing agent is a tertiary amine.

References Cited

UNITED STATES PATENTS

| 3,095,429 | 6/1963 | Smith et al. | 260—47 X |
| 3,142,688 | 7/1964 | Lastovica | 260—47 X |

FOREIGN PATENTS 935,720  9/1963  Great Britain.

OTHER REFERENCES

Lee et al., "Epoxy Resins," p. 15 relied on, McGraw-Hill Book Co. Inc., New York, 1957.

WILLIAM H. SHORT, *Primary Examiner.*

T. D. KERWIN, *Assistant Examiner.*